Nov. 7, 1933.　　　　I. H. JUDD　　　　1,934,128
VEHICLE SUSPENSION MEANS
Original Filed April 11, 1932　　2 Sheets-Sheet 1
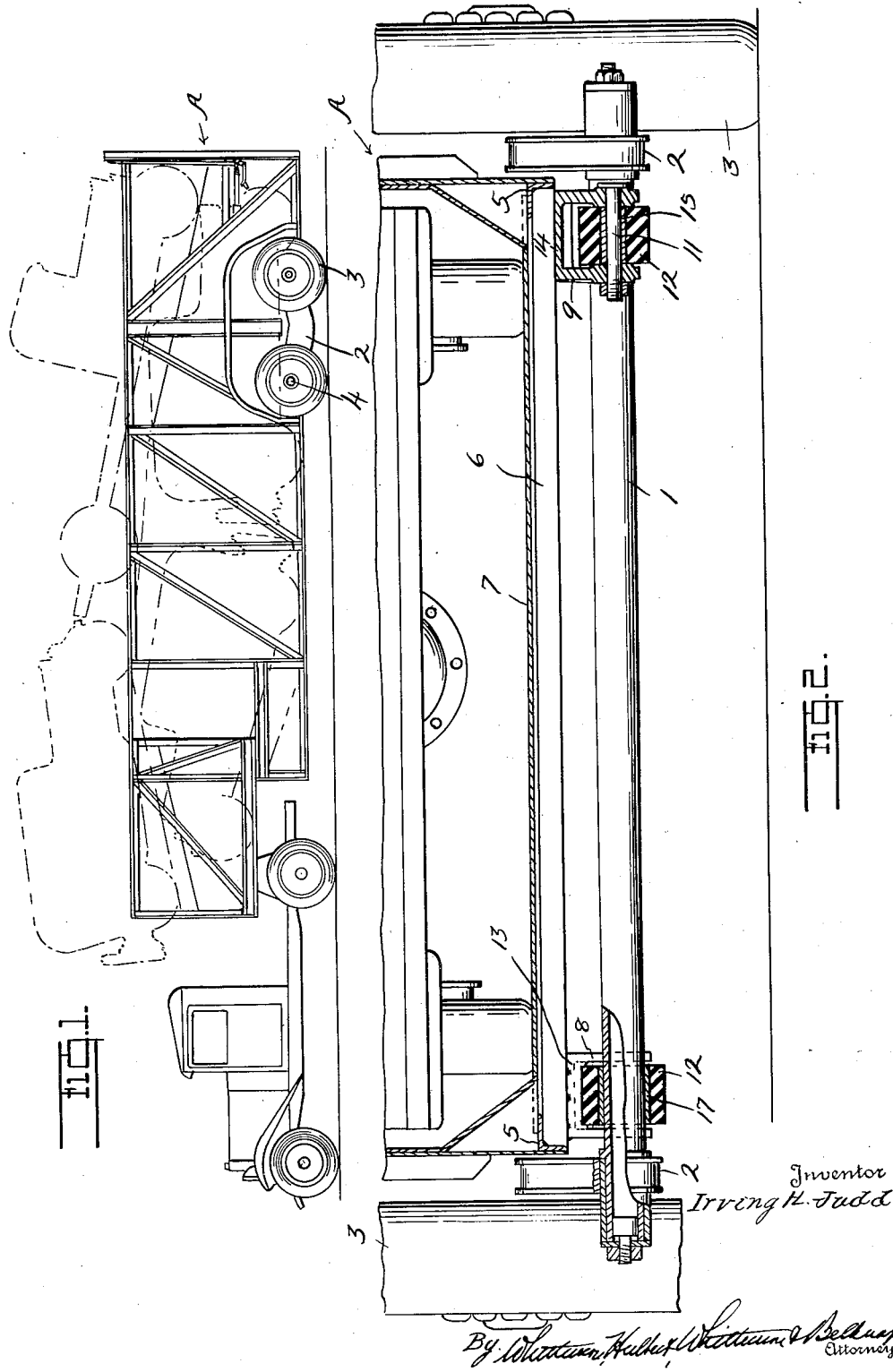

Nov. 7, 1933.  I. H. JUDD  1,934,128
VEHICLE SUSPENSION MEANS
Original Filed April 11, 1932   2 Sheets-Sheet 2
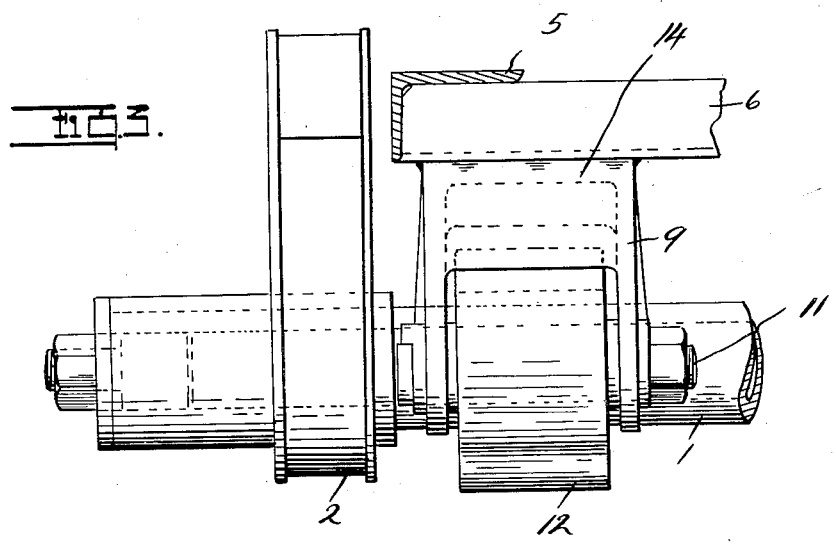
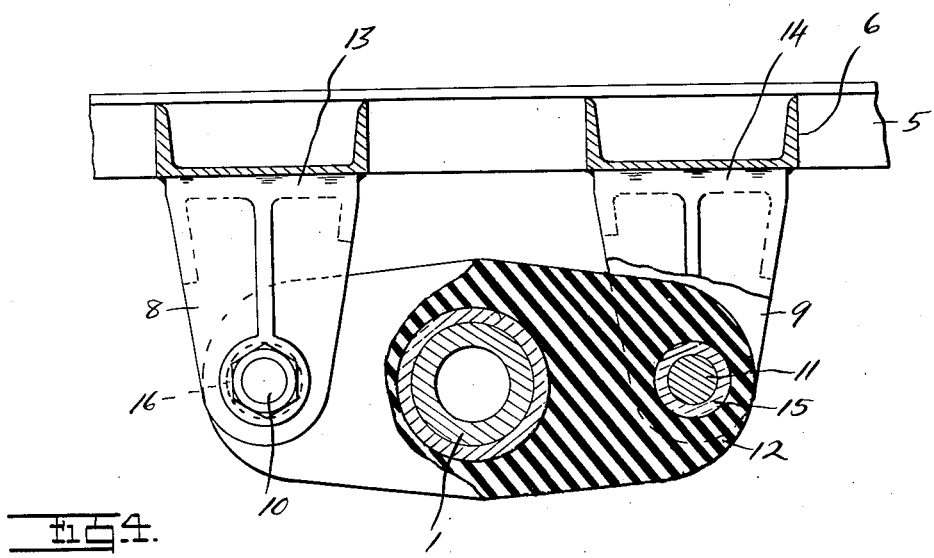
Inventor
Irving H. Judd Patented Nov. 7, 1933

1,934,128

UNITED STATES PATENT OFFICE 1,934,128

VEHICLE SUSPENSION MEANS

Irving H. Judd, Detroit, Mich., assignor to Whitehead & Kales Company, River Rouge, Mich., a corporation of Michigan Original application April 11, 1932, Serial No. 604,579. Divided and this application November 21, 1932. Serial No. 643,780

10 Claims. (Cl. 280—124)

This invention relates generally to vehicle suspension means and constitutes a division of my application, Serial No. 604,579, filed April 11, 1932.

One of the essential objects of the present invention is to provide a vehicle suspension means wherein rubber blocks instead of springs are provided for cushioning the chassis frame and absorbing the road shocks.

Another object is to provide a suspension means wherein the rubber blocks are constructed and arranged in such a way relative to the chassis frame and to the axle of a tandem wheel assembly that a floating action is provided between the axle and frame.

Another object is to provide a vehicle suspension means wherein the rubber blocks are connected to the axle and chassis frame in such a way that the over-all height of the vehicle is materially reduced.

Other objects, advantages and novel details of construction of this invention will be made more apparent as this description proceeds, especially when considered in connection with the accompanying drawings.

In the accompanying drawings:

Figure 1 is a side elevation of a vehicle having suspension means embodying my invention;

Figure 2 is a vertical transverse section through the structure;

Figure 3 is an enlarged fragmentary sectional view through the suspension means;

Figure 4 is a view taken at substantially right angles to Figure 3 and showing parts broken away and in section.

Referring now to the drawings, A is a suitable vehicle wherein 1 is an axle; 2 are walking beams pivotally mounted upon the axle at opposite ends thereof and preferably corresponding to those set forth in my application, Serial No. 603,191, filed April 4, 1932; and 3 are ground engaging wheels arranged in tandem and rotatably mounted on spindles 4 projecting laterally from the outer sides of said beams at opposite ends thereof. 5 are sills above the axle between the beams 2; 6 are crossbars extending between and terminally secured to said sills, and 7 is a flooring upon and secured to said sills and crossbars.

8 and 9 respectively are brackets depending from the crossbars 6; 10 and 11 respectively are bolts carried by the brackets, and 12 are blocks of rubber or rubber composition terminally connected to the bolts 10 and 11 and provided intermediate their ends with means for receiving the axle 1. As shown, the brackets 8 and 9 are inverted U-shape in form and the bases 13 and 14 respectively thereof are secured to the crossbars. The blocks 12 are elongated in form and are received between the arms of the U's. Tubes 15 and 16 respectively extend transversely of and vulcanized to the rubber blocks 12 receive the bolts 10 and 11, while tubes 17 extending transversely of and vulcanized to the blocks 12 receive and constitute bearings for the axle 1.

Thus from the foregoing it will be apparent the that the rubber blocks 12 will cushion the chassis frame and absorb the shocks. In fact, the construction is such that the axle 1 virtually floats between the brackets. In this connection it will be noted that both the blocks 12 and sills 5 are between and in the horizontal plane of the walking beams 2, hence the over-all height of the vehicle is lower and loading and unloading may be accomplished with greater ease. For example, if the vehicle is to be loaded with automobiles, shorter and lighter weight skids may be used from the ground to the flooring 7.

What I claim as my invention is:

1. In a vehicle suspension means, a pair of attaching brackets, bolts extending transversely of said brackets, and a block of rubber terminally connected to said bolts and provided intermediate its ends with a transversely extending opening for receiving and supporting an axle.

2. In a vehicle suspension means, a pair of spaced crossbars, and a block of rubber suspended from said bars and having a transversely extending opening for receiving and supporting an axle.

3. In a vehicle suspension means, a pair of spaced crossbars, an axle adjacent the crossbars, a block of rubber sleeved on the axle and having portions projecting laterally therefrom, a pair of brackets secured to the crossbars and having portions straddling the laterally projecting portions of the block, and connections between said block and brackets including means extending through the portions aforesaid of said block and brackets.

4. In a vehicle suspension means, a pair of spaced crossbars, brackets depending from said bars, bolts extending transversely of said brackets, an axle between said brackets, and a connection between the brackets including a block of resilient material having spaced transversely extending openings receiving the bolts and axle.

5. In a vehicle suspension means, an elongated block of rubber provided at opposite ends thereof and at a point substantially midway of its ends with transversely extending openings for receiving a couple of supporting elements and an axle respectively.

6. In a vehicle suspension means, a block of rubber provided at spaced points with three transversely extending openings, two of said openings being substantially the same size and located at opposite ends of the block, and the other of said openings being larger than the first mentioned openings and located substantially midway therebetween, and tubes in said openings, those in the first mentioned openings being designed to receive supporting elements for the block, and the one in the third opening being designed to receive and constitute a bearing for an axle.

7. In a vehicle suspension means, a vehicle frame, an axle extending across the frame, and a connection between the axle and frame including brackets depending from the frame, a block of resilient material extending between the brackets, tubes extending through the block, one of said tubes receiving the axle, and bolts extending through the other of said tubes and carried by the brackets.

8. In a vehicle suspension means, a vehicle frame, an axle extending across the frame, and a connection between the axle and frame including spaced brackets depending from the frame upon opposite sides of the axle, and a block of resilient material terminally connected to the brackets and having a transversely extending opening receiving the axle.

9. In a vehicle suspension means, a frame, spaced brackets secured to said frame, an axle between said brackets, and a connection between said axle and frame including an elongated block of resilient material having an opening intermediate of its ends receiving the axle and having its opposite ends secured to the bracket.

10. In a vehicle suspension means, a frame, spaced brackets secured to said frame, bolts carried by the brackets, one to each bracket, an axle between said brackets, and a connection between said axle and frame including a yieldable element having transversely extending openings at opposite ends thereof receiving the bolts and provided intermediate of said ends with an opening that receives the axle.

IRVING H. JUDD.